(12) United States Patent
Blackwell et al.

(10) Patent No.: US 7,818,282 B2
(45) Date of Patent: Oct. 19, 2010

(54) SYSTEM AND METHOD FOR THE SUPPORT OF MULTILINGUAL APPLICATIONS

(75) Inventors: Richard F. Blackwell, Ottawa (CA); Hendrik Cazemier, Spencerville (CA); Kevin M. Ferguson, Manotick (CA); Guy Lacoursiere, Gatineau (CA); Lee Daw-Yong Godfrey, Ottawa (CA); Kenneth R. Leese, Ottawa (CA); Eric McCully, Gloucester (CA); Charles M. Potter, Greely (CA); Claude Tennier, Ottawa (CA); Wayne C. Salter, Ashton (CA)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 10/884,807

(22) Filed: Jul. 2, 2004

(65) Prior Publication Data

US 2006/0004738 A1    Jan. 5, 2006

(51) Int. Cl.
*G06F 17/30*    (2006.01)
*G06F 17/20*    (2006.01)
*G06F 17/27*    (2006.01)

(52) U.S. Cl. .............. 707/4; 707/999.004; 707/810; 704/1; 704/8; 704/9; 715/203; 715/234

(58) Field of Classification Search ............. 707/1–10, 707/100–104.1, 200–201, 999.004, 999.01, 707/802, 807, 810; 704/1–5, 8, 9; 715/530–531, 715/536, 703, 234, 203; 705/26, 27
See application file for complete search history.

(56) References Cited

U.S. PATENT DOCUMENTS 5,301,109 A * 4/1994 Landauer et al. ............... 704/9
5,530,861 A * 6/1996 Diamant et al. ................ 705/8

(Continued)

FOREIGN PATENT DOCUMENTS

CA    2 410 277 A1    11/2001

(Continued)

OTHER PUBLICATIONS

"An Internationalised Object Data Mode: A Locale-Based Approach", Proc. 9th Int'l Conference on Data Management of Data[COMAD98], Hyderbad, India, 1998.*

(Continued)

*Primary Examiner*—Miranda Le
(74) *Attorney, Agent, or Firm*—Shumaker & Sieffert, P.A.

(57) ABSTRACT

A method, a system and a storage medium for preparing multilingual reports at client sites. The client sites are connected to a server and a data source. Each of the client sites may use a different locale. A product locale is selected at the client site for defining a user interface appearance. After a report specification is generated, a content locale is selected at the client site, which defines an appearance and a format of a report. A metadata model with run-time parameters is then constructed. The run-time parameters include mapping rules for the content locale. The run-time parameters are updated based on the content locale. A query is built using the report specification and the metadata model. Data appropriate to the individual content locale is then extracted from the same data source using the query.

19 Claims, 9 Drawing Sheets

U.S. PATENT DOCUMENTS

| | | | |
|---|---|---|---|
| 5,551,055 A * | 8/1996 | Matheny et al. ............... | 710/62 |
| 5,579,444 A | 11/1996 | Dalziel et al. | |
| 5,652,884 A * | 7/1997 | Palevich ........................ | 713/1 |
| 5,687,366 A * | 11/1997 | Harvey et al. ................. | 707/10 |
| 5,758,355 A | 5/1998 | Buchanan | |
| 5,767,854 A | 6/1998 | Anwar | |
| 5,787,452 A * | 7/1998 | McKenna ................... | 715/234 |
| 5,794,246 A | 8/1998 | Sankaran et al. | |
| 5,802,352 A * | 9/1998 | Chow et al. ................. | 715/517 |
| 5,870,746 A | 2/1999 | Knutson et al. | |
| 5,873,111 A * | 2/1999 | Edberg ........................ | 715/202 |
| 5,907,326 A * | 5/1999 | Atkin et al. ................. | 715/866 |
| 5,917,484 A * | 6/1999 | Mullaney .................... | 715/703 |
| 5,937,155 A | 8/1999 | Kennedy et al. | |
| 6,018,742 A * | 1/2000 | Herbert, III ................. | 707/102 |
| 6,067,548 A | 5/2000 | Cheng | |
| 6,160,549 A | 12/2000 | Touma et al. | |
| 6,195,653 B1 * | 2/2001 | Bleizeffer et al. .............. | 707/2 |
| 6,260,050 B1 | 7/2001 | Yost et al. | |
| 6,341,286 B1 * | 1/2002 | Kawano ..................... | 707/101 |
| 6,349,275 B1 * | 2/2002 | Schumacher et al. ........... | 704/8 |
| 6,430,584 B1 | 8/2002 | Comer et al. | |
| 6,457,008 B1 | 9/2002 | Rhee et al. | |
| 6,460,031 B1 * | 10/2002 | Wilson et al. ................... | 707/3 |
| 6,469,713 B2 * | 10/2002 | Hetherington et al. ...... | 715/740 |
| 6,487,546 B1 * | 11/2002 | Witkowski .................... | 707/1 |
| 6,496,793 B1 * | 12/2002 | Veditz et al. .................... | 704/8 |
| 6,542,515 B1 * | 4/2003 | Kumar et al. ............... | 370/463 |
| 6,567,814 B1 | 5/2003 | Bankier et al. | |
| 6,581,068 B1 | 6/2003 | Bensoussan et al. | |
| 6,697,999 B1 | 2/2004 | Breuer et al. | |
| 6,768,994 B1 * | 7/2004 | Howard et al. ................ | 707/10 |
| 6,785,689 B1 | 8/2004 | Daniel et al. | |
| 6,845,367 B2 * | 1/2005 | Bendel et al. ................ | 705/65 |
| 6,871,319 B2 | 3/2005 | Taboada et al. | |
| 6,882,353 B2 * | 4/2005 | Nettles et al. ............... | 715/764 |
| 6,892,348 B1 | 5/2005 | Truelove et al. | |
| 6,980,963 B1 * | 12/2005 | Hanzek ....................... | 705/26 |
| 7,015,911 B2 | 3/2006 | Shaughnessy et al. | |
| 7,139,686 B1 * | 11/2006 | Critz et al. ..................... | 703/2 |
| 7,140,001 B1 * | 11/2006 | Natori et al. ................ | 717/105 |
| 7,177,859 B2 * | 2/2007 | Pather et al. .................... | 707/3 |
| 7,207,005 B2 * | 4/2007 | Lakritz ....................... | 715/536 |
| 7,213,202 B1 * | 5/2007 | Kagle ......................... | 715/517 |
| 7,228,353 B1 * | 6/2007 | Franceschelli et al. ...... | 709/229 |
| 7,240,073 B2 | 7/2007 | Benson et al. | |
| 7,356,758 B1 | 4/2008 | Bedell et al. | |
| 2002/0069230 A1 * | 6/2002 | Schubert et al. ............. | 707/530 |
| 2002/0073080 A1 | 6/2002 | Lipkin | |
| 2002/0099743 A1 | 7/2002 | Workman et al. | |
| 2002/0143831 A1 | 10/2002 | Bennett | |
| 2002/0174000 A1 | 11/2002 | Katz et al. | |
| 2002/0174196 A1 * | 11/2002 | Donohoe et al. ............ | 709/219 |
| 2002/0175937 A1 * | 11/2002 | Blakely et al. ............... | 345/744 |
| 2002/0184308 A1 * | 12/2002 | Levy et al. .................. | 709/203 |
| 2002/0188896 A1 * | 12/2002 | Filteau et al. .................. | 714/57 |
| 2003/0046527 A1 * | 3/2003 | Musuchenborn ............... | 713/1 |
| 2003/0084053 A1 | 5/2003 | Govrin et al. | |
| 2003/0088447 A1 | 5/2003 | Desbiens et al. | |
| 2003/0088540 A1 | 5/2003 | Edmunds et al. | |
| 2003/0088565 A1 | 5/2003 | Walter et al. | |
| 2003/0140316 A1 * | 7/2003 | Lakritz ....................... | 715/536 |
| 2003/0144922 A1 * | 7/2003 | Schrantz ...................... | 705/26 |
| 2003/0172168 A1 | 9/2003 | Mak et al. | |
| 2003/0217063 A1 | 11/2003 | Tomic et al. | |
| 2004/0002972 A1 * | 1/2004 | Pather et al. .................... | 707/6 |
| 2004/0030781 A1 * | 2/2004 | Etesse et al. ................ | 709/225 |
| 2004/0060001 A1 | 3/2004 | Coffen et al. | |
| 2004/0088650 A1 | 5/2004 | Killen et al. | |
| 2004/0139102 A1 | 7/2004 | Vierich et al. | |
| 2004/0139426 A1 | 7/2004 | Wu | |
| 2004/0221233 A1 * | 11/2004 | Thielen ....................... | 715/530 |
| 2004/0236738 A1 | 11/2004 | Thier et al. | |
| 2004/0243593 A1 | 12/2004 | Stolte et al. | |
| 2005/0010550 A1 | 1/2005 | Potter et al. | |
| 2005/0033600 A1 | 2/2005 | Geddes et al. | |
| 2005/0131924 A1 | 6/2005 | Jones | |
| 2005/0177532 A1 | 8/2005 | Desbiens | |
| 2005/0198042 A1 | 9/2005 | Davis | |
| 2005/0228815 A1 * | 10/2005 | Carus et al. ................. | 707/102 |
| 2006/0004745 A1 | 1/2006 | Kuhn et al. | |
| 2006/0080082 A1 * | 4/2006 | Ravindra et al. ............... | 704/8 |
| 2006/0200448 A1 | 9/2006 | Edmunds et al. | |
| 2006/0259509 A1 | 11/2006 | Stolte et al. | |
| 2007/0130503 A1 | 6/2007 | Voshell | |
| 2007/0150241 A1 | 6/2007 | Critz et al. | |
| 2007/0225966 A1 * | 9/2007 | Suen et al. ..................... | 704/9 |

FOREIGN PATENT DOCUMENTS

| | | |
|---|---|---|
| CA | 2361176 | 5/2003 |
| WO | 00/42553 | 7/2000 |

OTHER PUBLICATIONS

Valerie Jackson, Global Businesses can Use Local Languages with OS/2 Warp Server for e-business, IBM Network Computing Software, Apr. 1999.*

Bott, Ed, "Using Microsoft Office 2000," Que Corporation, 1999, 34 pages.

Ronen et al., "Spreadsheet Analysis and Design", ACM, vol. 32, No. 1, 1989, (pp. 84-93).

Ballou et al., "Implication of Data Quality for Spreadsheet Analysis", Data Base, 1987, (pp. 13-19).

Augusto Celentano et al., "Schema Modelling for Automatic Generation of Multimedia Presentations," ACM 2002, pp. 593-600.

Canadian Office Action from related Canadian Application No. 2,472,940 mailed Jan. 28, 2009 (2 pages).

Robin Abraham et al., "Inferring Templates from Spreadsheets," 2006 ACM, pp. 182-191.

Prague et al., "Microsoft Access 97 Bible Gold Edition", IDG Books Worldwide Inc. 1999, pp. 400-404, 924-929.

* cited by examiner

Global Configuration

Product Locales | Content Locales | Product Locale Mappings
Content Locale Mappings | Currencies | Fonts | Cookie settings

| | Key | Locale Mapping | Description |
|---|---|---|---|
| ☐ | cs-* | cs | Czech |
| ☐ | da-* | da | Danish |
| ☐ | de-* | de | German |
| ☐ | el-* | el | Greek |
| ☐ | en-* | en | English |
| ☐ | es-* | es | Spanish |
| ☐ | fi-* | fi | Finnish |
| ☐ | fr-* | fr | French |
| ☐ | hu-* | hu | Hungarian |
| ☐ | it-* | it | Italian |
| ☐ | ja-* | ja | Japanese |
| ☐ | ko-* | ko | Korean |
| ☐ | nl-* | nl | Dutch |
| ☐ | no-* | no | Norwegian |
| ☐ | pl-* | pl | Polish |
| ☐ | pt-* | pt | Portuguese |
| ☐ | ro-* | ro | Romanian |
| ☐ | ru-* | ru | Russian |
| ☐ | sk-* | sk | Slovak |
| ☐ | sv-* | sv | Swedish |
| ☐ | th-* | th | Thai |
| ☐ | tr-* | tr | Turkish |
| ☐ | zh-* | zh | Chinese |

Add...

OK | Cancel

FIG. 6

Global Configuration

| Content Locale Mappings | Currencies | Fonts | Cookie settings |
| Product Locales | Content Locales | | Product Locale Mappings |

| | Supported Locale | Description |
|---|---|---|
| ☐ | cs | Czech |
| ☐ | cs-cz | Czech (Czech Republic) |
| ☐ | da | Danish |
| ☐ | da-dk | Danish (Denmark) |
| ☐ | de | German |
| ☐ | de-at | German (Austria) |
| ☐ | de-ch | German (Switzerland) |
| ☐ | de-de | German (Germany) |
| ☐ | de-lu | German (Luxembourg) |
| ☐ | el | Greek |
| ☐ | el-gr | Greek (Greece) |
| ☐ | en | English |
| ☐ | en-au | English (Australia) |
| ☐ | en-be | English (Belgium) |
| ☐ | en-bw | English (Botswana) |
| ☐ | en-ca | English (Canada) |
| ☐ | en-gb | English (United Kingdom) |
| ☐ | en-hk | English (Hong Kong) |
| ☐ | en-ie | English (Ireland) |
| ☐ | en-in | English (India) |
| ☐ | en-nz | English (New Zealand) |
| ☐ | en-ph | English (Philippines) |
| ☐ | en-sg | English (Singapore) |

Add...

[ OK ]  [ Cancel ]

FIG. 7

Global Configuration

Product Locales | Content Locales | Product Locale Mappings
Content Locale Mappings | Currencies | Fonts | Cookie settings

| | Supported Currency | Description |
|---|---|---|
| ☐ | USD | $ (USD) - United States of America, dollar |
| ☐ | EUR | € (EUR) - Euro Member Countries, euro |
| ☐ | JPY | ☐ (JPY) - Japan, yen |
| ☐ | GBP | £ (GBP) - United Kingdom, pound |
| ☐ | CAD | $ (CAD) - Canada, dollar |
| ☐ | AUD | $ (AUD) - Australia, dollar |
| ☐ | DKK | kr (DKK) - Denmark, krone |
| ☐ | CHF | SFr. (CHF) - Switzerland, franc |
| ☐ | SGD | S$ (SGD) - Singapore, dollar |
| ☐ | HKD | HK$ (HKD) - Hong Kong, dollar |
| ☐ | CNY | ☐ (CNY) - China, yuan renminbi |
| ☐ | INR | Rp (INR) - India, rupee |
| ☐ | KRW | ₩ (KRW) - South Korea, won |
| ☐ | MXN | $ (MXN) - Mexico, peso |
| ☐ | BRL | R$ (BRL) - Brazil, real |
| ☐ | CZK | Kč (CZK) - Czech Republic, koruna |
| ☐ | HUF | Ft (HUF) - Hungary, forint |
| ☐ | ROL | LEI (ROL) - Romania, leu |
| ☐ | RUB | p. (RUB) - Russia, ruble |
| ☐ | SKK | Sk (SKK) - Slovakia, koruna |
| ☐ | THB | ฿ (THB) - Thailand, baht |
| ☐ | TRL | TL (TRL) - Turkey, lira |
| ☐ | UAH | гре. (UAH) - Ukraine, hryvnia |

Add...

OK | Cancel

FIG. 8

SYSTEM AND METHOD FOR THE SUPPORT OF MULTILINGUAL APPLICATIONS

FIELD OF THE INVENTION

The present invention relates generally to the support of locales in business intelligence systems, and more particularly to a method and system for supporting a plurality of locales in a computer application.

BACKGROUND OF THE INVENTION

Multinational corporations deploying and using business intelligence or decision support systems today incur significant costs and time delays in developing report templates and in writing programs to meet their needs. As corporations expand their requirements for tracking performance, they are faced with a growing requirement to take account, not only of language, but of the location where reports will be used—the combination being known as a locale. There are many aspects to the problem, all of which must be managed in order to have a successful solution. These include:

- Data encoding—this issue has generally been dealt in the computing industry through the use of Unicode and is not considered further here.
- Locale—this includes the display, in a language and format of the users' choice, of reports and of the user interfaces of the application that defines and produces them.
- Data storage—while Unicode provides a data-encoding format for storing data in many languages, it does not address the data management issues. Of primary importance is how the database is structured to support multilingual data. A general solution is to translate specific textual data and allow the user to select their language (or locale) of choice.
- Application strings—in the context of reporting, this refers to items that are not derived from the database content, such as the title of a report.
    - Data formatting—data formats for time, dates, currency, etc, vary between locales. For example, in most English locales one thousand Japanese yen is presented as ¥1,000.00, whereas in France the same amount is generally presented as 1 000,00 ¥.

Many business intelligence applications rely on the proper identification of the locale and use the locale information to determine language and other location specific parameters for the production of reports. The locale is also used to customize application behavior. For example, when the locale-sensitive date format function needs to format a date, it uses the convention appropriate to the current locale. If the locale is English, it uses the word "Monday" and if it is French, it uses the word "Lundi". Thus a locale identifies a language used in a particular region for the purposes of localization. A locale also identifies a group of users who have similar cultural and linguistic expectations for user interfaces (and the kinds of data they process).

In the past many of the issues related to the preparation of reports in multiple languages have been ignored or in some cases have been addressed through the expensive option of custom application programming. Therefore, the preparation of reports in multiple locales remains problematic and expensive.

For the foregoing reasons, there is a need for improved support for multiple languages for multinational corporations requiring a standardized reporting solution.

SUMMARY OF THE PRESENT INVENTION

The invention provides a method for producing reports in a computer-based business intelligence application using client-server technology, having at least one client, and employing a data access language to retrieve business data from one or more data sources.

The present invention comprises the steps of presenting a user with a list of valid product locales, accepting from the report author user a selected product locale, thereby determining the localized user interface at a client for authoring and using report specifications, presenting a localized user interface to the report author user, thereby allowing the report author user to work in the language of their choice, generating a report specification, deploying the report specification, presenting a consumer user with a list of valid content locales, accepting from the consumer user a selected content locale, thereby determining the data in the one or more data sources to be used in the report resulting from applying the report specification and the format of the resulting report, running the report using the report specification, the selected content locale, and the one or more data sources to produce a report output and displaying the report output.

The present invention provides an effective and commercial solution to these issues through configuration and feature options, that is a complete application for producing business reports. The required support is supplied as 'out of the box' features that are not available in other known products.

An embodiment of the invention provides for defining locale mappings and mapping a locale from an unsupported locale to supported locale.

A further embodiment of the invention provides for defaulting to a valid locale for users with incomplete or invalid locale specifications, and for specifying object names, descriptions, and tips in multiple languages.

An embodiment of the present invention provides for multilingual (i.e. multi-locale) objects such as report titles, column titles, and column descriptions to be specified in the metadata model such that users automatically see them in their own language. A report is produced in the language preferred by the consumer with no authoring effort.

Embodiment of the present invention thus provides a true multilingual reporting environment supporting both report authoring, and query and usage by users, operating concurrently in different languages. The locale mechanism does not require an application to know in advance which locale is to be used and this makes the job of report authors simpler. The above objectives are achieved without the need for custom programming thereby simplifying the widespread adoption of corporate standards of reporting across large organizations.

BRIEF DESCRIPTION OF THE DRAWINGS

Embodiments of the invention are described with reference to the following drawings.

FIGS. 6 to 11 show screen shots from embodiments of the invention illustrating the locale mapping function.

DETAILED DESCRIPTION OF EMBODIMENTS OF THE INVENTION

Figure 1:
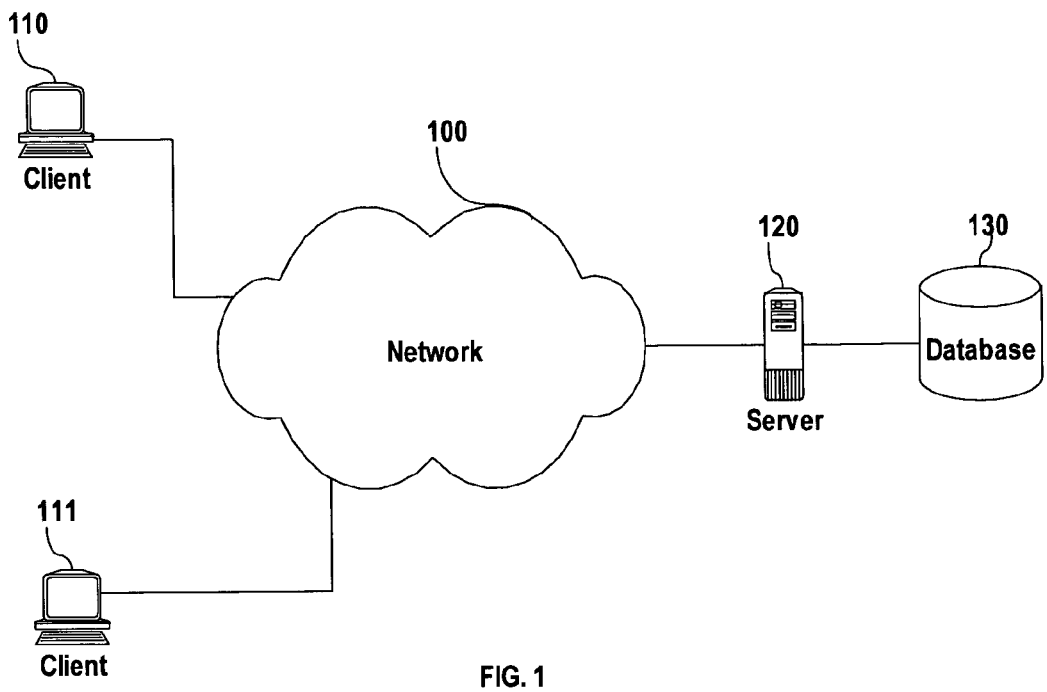
FIG. 1 shows a network environment suitable for business intelligence systems that make use of the invention.

The following glossary of terms will assist in understanding the present invention. It includes specific information about embodiments of the invention.

Locale:

A locale is generally defined as the combination of a language and an optional region. For the purposes of this discussion locale consists of one or more pieces of ordered information, although other information may be added. IETF RFC 3066 recommends using the ISO standard language abbreviations (ISO 639) and ISO standard region abbreviations (ISO 3166). Examples of locale names are fr (French), de-ch (German spoken in Switzerland), or en-us (English spoken in the United States of America).

Language code: The languages are specified using a two- or three-letter lowercase code for a particular language. For example, Spanish is "es", English is "en" and French is "fr". The various language codes that are used are defined according to ISO639.

Country code: There are often different spellings within the same language; for example, colour vs. color, neighbour vs. neighbor, in the UK and US respectively. A country code is used to specify the one to use. The various country codes that are used are also defined according to ISO3166.

Embodiments of the invention allow both report authors and consumers (users of reports) operating in their choice of interface language to have full access to content (data) in that language, or in any one of a number of languages. Embodiments of the invention allow for two or more locales. One, a product locale, affects the user interface that is supplied by the product vendor and used by report authors to develop report specifications, and another, a content locale, affects the content (business data) that is supplied by the customer and employed by consumers to produce particular reports. In some embodiments a run locale is also defined: This is a validated content locale (see later). Administrators are able to configure various languages and default options. In embodiments of the invention, the different locales are recorded (in a cache) as a user preference.

Some embodiments ensure that each locale preference is assigned a default locale. In some of these embodiments the default for the appropriate locale is the user's preference for locale as set in their browser or client environment. For example, in Microsoft Internet Explorer™, the browser locale is found in the menu: Tools—>Internet Options—> Languages. In these embodiments, in the event that the browser locale is not valid, means are provided to allow an administrator to define mappings from arbitrary locales to supported product and content locales.

Product Locale:

A product locale defines the appearance (language, layout, data format, etc) of the product user interface. A user can only select from a list of valid locales. In some embodiments, if no selection is made, the system applies a default.

Embodiments of the invention support multiple product locales allowing the creation of different report author user interfaces for different languages such as English and Japanese. Other embodiments use the locale to handle any spelling differences in dialects, such as between US English and UK English.

Framework manager is the tool used to build the metadata model, define its objects, and publish the metadata model to the content manager. In some embodiments of the invention, the product locale, in addition, affects the appearance (language) and format of the names, description, tips, and like objects of the content manager and the framework manager.

Content Locale:

A content locale is used to modify the appearance and format of the content of reports as well as to ensure the right data is extracted from the data source. Formatting (rendering) of data occurs once the appropriate data has been retrieved from the data source. Embodiments of the invention support multiple content locales allowing the creation of reports that are locale dependent.

Report authors or consumers (either directly or via client environment settings) may inadvertently choose locales that are either invalid or unusable. Some embodiments therefore provide the ability to map arbitrary locale values to locale values that are supported/valid in the environment, either in the user Interface of the user (product locale) or with respect to the customer's data (content locale). The content locale, once validated, is sometimes known as the run locale. The configuration section below discusses other aspects of locale configuration.

An appropriate multilingual framework manager and metadata model permit extraction of multilingual data from the data source. One such suitable environment is provided by a modified version of that described in U.S. Pat. No. 6,609, 123 "Query engine and method for querying data using metadata model"—Cazemier, et al, hereinafter "Cazemier.", "Cazemier" provides a query engine for formulating a query to obtain data from one or more data sources using a client application receiving user inputs and a metadata model, which contains model objects that represent the data sources. The query engine comprises a query specification interface for allowing the client application to generate a query specification based on a user input, and receiving the generated query specification. The query engine also comprises a query engine component for translating the query specification into a data source query that is applicable to the data sources, based on model objects in the metadata model having business intelligence. "Cazemier" also provides a method for formulating a query to obtain data from one or more data sources using a client application receiving user inputs and a metadata model containing model objects that represent the data sources. This method includes generating a query specification based on a user input using the client application; receiving the generated query specification; and translating the query specification into a data source query that is applicable to the data sources, based on model objects in the metadata model having business intelligence.

Turning now to FIG. 1, which shows a typical client-server based network environment in which embodiments of the invention may be practiced, we see a number of clients 110, 111, interacting with a server 120 over a network 100. These clients are general purpose, and their actual function may vary, but in this case they represent user-controlled terminals having software installed that allows thin client operation, often including a web browser and associated applets or client application. The server is also a general purpose computer having installed in it software to carry out Business Intelligence functions and ancillary operations, including content management. The server 120 is connected to one or more data sources, or data warehouses 130. These data sources contain business data used to produce reports required by users. These reports may be displayed on screens of the client computers 110, 111, but in some cases hard copy can be produced using printers (not shown) associated with the clients or server.

Figure 2:
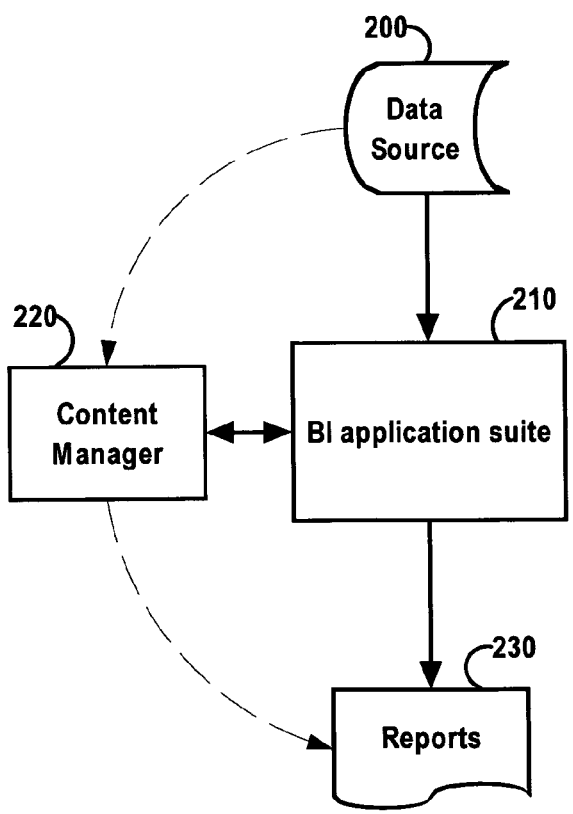
FIG. 2 shows a simplified version of a BI system in which embodiments of the invention may be practiced.

FIG. 2 shows in outline form the major elements of a Business Intelligence (BI) system capable of incorporating embodiments of the present invention. The BI application suite 210 makes use of a content manager 220 to store and serve report specifications from which to construct reports 230. The content manager 220 stores and serves definitions of one or more business data sources 200, among other environment data, required by the reporting subsystem (not shown). The one or more business data sources 200 are typically treated as read-only, since they contain historical information from which business trends and other analyses can be produced. The BI application suite 210 carries out many different functions, including a framework manager (not shown) that is used to construct metadata models. These functions, in combination, permit large businesses to maintain a uniform reporting process, even where they original data has different formats and content.

Figure 3:
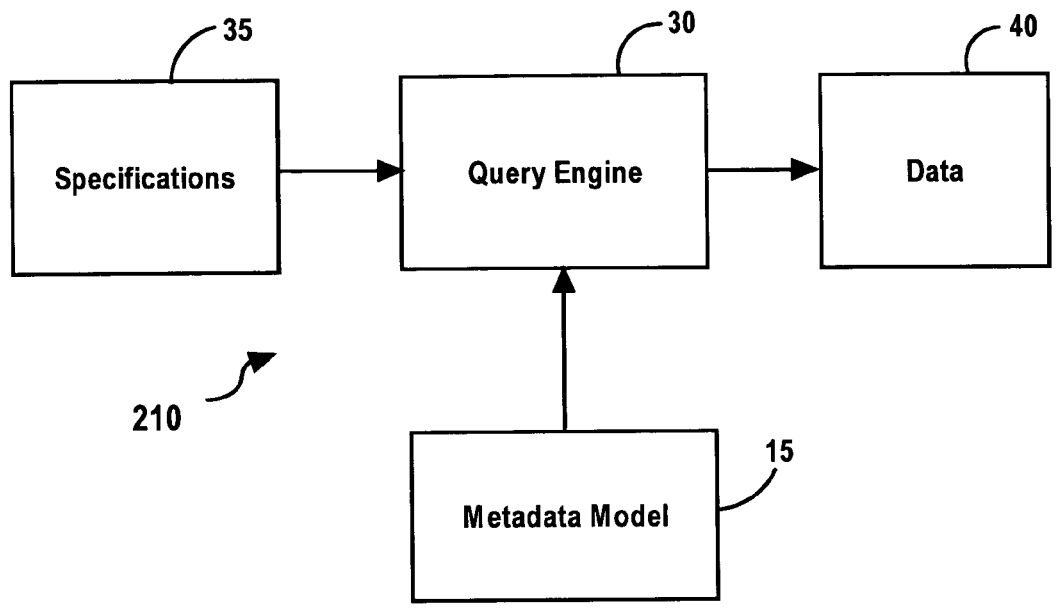
FIG. 3 shows how the metadata model is used.

We next briefly described, with reference to FIGS. 2 and 3, the use of the metadata model 15 by the query engine 30 as found in the BI application suite 210. As shown in FIG. 3, specifications 35 and a metadata model 15 are used by the query engine 30 to produce data 40 extracted from the data source 200 (FIG. 2). This data 40 is used in the preparation of a report 230. A user interacts with a business intelligent tool or client application 210 to generate a user's request for information. Upon the receipt of the user's request, the client application generates an initial specification 35 based on the request. The specification 35 may be ambiguous. Also, it may not be in a form that can be applied to the data sources directly. Using the information that is built in the metadata model 15, the query engine 30 makes the specification 35 unambiguous and builds a query in terms of the data access layer for the specification 35. This intermediate formulation of the query is called a physical query and is subsequently translated into a data source specification language. The data source specification language is typically Structured Query Language (SQL), although other data source specification languages may be used. A query in a data source specification language can be executed on the data sources. Thus, the correct data 40 may be obtained. This process is explained in more detail in "Cazemier". A metadata model capable of supporting product and content locales is required. The metadata model, configured by administrators, is used to provide the ability to dynamically (at consumer runtime) adjust SQL statements to take into account locale preferences. Thus the metadata model and associated content manager together with the macro-like mechanism allow seamless access to the business data containing multilingual information. Embodiments of the invention preferably require the introduction of run-time parameters in the metadata describing the underlying database.

Embodiments of the invention introduce prompts and other mechanisms to allow the user to select or establish run-time parameters. These embodiments allow the selection of database elements that are to be driven from the run-time parameters using mapping rules in the model. In this way a single model or report can handle any variability that might be determined (or defined) using run-time or user-selected parameters. The variable factors include, but are not limited to, user selected prompt responses, report language, database instance, and test environments. The parameters are incorporated into the model (encapsulated) during the model development phase. The report authors produce report templates suitable for a variety of audiences, for example where they all have a common theme. The report authors need know nothing about run-time parameters in producing report templates.

In embodiments of the invention, a number of forms of "macro" style text substitution are introduced into objects of the metadata model on which report authoring is based: in particular, session parameters, and parameter maps. These macro elements are expressed in a syntax that can be detected and acted upon appropriately by the query (generation) engine, which incorporates a macro-expanding pre-processor.

In the resultant syntax, the expressions, or rather partial expressions, to be substituted in the so-called "macrotized" SQL expressions are distinguished by special symbols bracketing the partial expressions. These symbols are carefully chosen to allow the pre-processor to unambiguously identify the partial expressions. In one embodiment, the chosen special symbols are "#". For example:

<expression_to_be_substituted>#.

Alternative special symbols may be used, providing they are compatible with the syntax of the database language. In other words, such symbols should not be part of the original database language nor should they be in its reserved symbol dictionary. In some embodiments, partial expressions may be nested, in which case it has been found convenient to introduce the inner levels of macro using one or more other special symbols. For convenience these symbols may also be required to be compatible with the database language syntax, although, with careful design of the parser within the pre-processor this may not be necessary. This nesting is also known as de-referencing and is useful in situations where a session-parameter may point to a parameter-map-entry and vice versa.

All embodiments of the invention given here are described in terms of SQL and relational databases using simple examples of situations where use of the invention is advantageous. However, it will be apparent to those appropriately skilled in the art that the invention is applicable to more complex environments, to databases other than relational ones, and to programming languages other than SQL.

In one example embodiment, the user is able to select a language code (say English, German, or French: en, de, or fr) at run time; that is, when an actual business report is generated. The selection of the language code allows the name of an item in a sales catalogue to be expressed in the chosen language, viz.: dishwasher, Spülmaschine or lave-vaisselle, respectively.

To achieve this result, that part of the SQL expression describing the projection list (or derived column list) for a database query results in a parameter map lookup based on a language code selected at run time. This parameter map defines the relationship between the language codes (designating for example English, German, or French: en, de or fr) and the columns containing the required data for that language. Thus, the name of an item in a sales catalogue is expressed as a literal string in a particular language: that is "dishwasher","Spülmaschine", or "lave-vaisselle" as appropriate for English, German, or French. At run time, the language code is mapped to the column name, which is then substituted in to the SQL statement before the query is run.

In this embodiment, string processing is performed on the macrotized SQL expressions using an SQL pre-processor. The resultant valid SQL expressions are then passed, via the main query engine function, to the database engine.

In this simple embodiment, the macrotized SQL expression as generated by the report author looks like this code fragment:

```
    SELECT partno, partname#$locale# FROM Parts ...
```

A table of locales provides a translation for the #$locale# string to substitute in the macrotized SQL expression to produce a valid expression.

The macrotized SQL expressions, and associated tables may be retained in a report outline for later use.

The particular entry used from this table is based on one of a number of parameters that are set for this environment/session, as described below. In this case, when the SQL preprocessor is invoked with locale ="_en", the result is the following fragment of the SQL statement:

```
    SELECT partno, partname_en FROM Parts ...
```

The selection of the appropriate locale string is achieved using techniques such as indexing into the table of locales, the index value being that appropriate to the language chosen for the session, although other equivalent mechanisms may be used. In this way, other languages may be selected during execution of a report depending on the user's locale without the user being involved in manipulating the syntax of the database access language. However, this particular embodiment requires that each of the columns defined by partname#$locale# be constructed with a strict syntax, which provides scope for error.

The flowchart of FIG. 3 is next described. It generally describes embodiments of the invention. Each embodiment starts 200 and a report author generates the necessary macrotized expressions and tables 210. These are then stored for later use 220 by a user who provides parameters 230 required to generate the valid database expressions, and a report is produced 240. A user may repeat the operations in 220 and 230 to produce more than one report, and more than one user may use the results of the operations 210, 220 to produce customised reports.

In other embodiments, to overcome some of the restrictions of the earlier embodiment, the fragment of the macrotized SQL expression looks like:

```
    SELECT partno, #$part_locale {$locale}# from Parts ...
```

Here, the table used to replace the #$part_locale{$locale}# partial expression contains the complete translation of the field name, keyed on the locale, thereby allowing more flexibility in the assignment of the field names. This is shown clearly in the FIG. 4 which shows an example of a parameter map 100, comprising a number of elements including its Name 110, and a two column table, the columns being the language Key 120, and the Value 125, in this case a reference or pointer to the part name translated into the applicable language (also referred to as a "field name"). The parameter map may also contain other information that is useful in other embodiments: in this example a Default value 115 for the reference or pointer to the translated part name. This value is selected and returned in some embodiments when the user opts not to choose a locale, or where a Key (or Value) has not (yet) been provided.

The parameter map function effectively introduces another level of 'indirection'. It has the advantage that the entire expression is defined within a single parameter map (or table). A session parameter, established for each session, is used to determine the appropriate entry (Key and Value) in the table. The resultant SQL expression is the same as the previous example:

```
    SELECT partno, partname_en FROM Parts ...
```

In all embodiments, the table or tables determined by the partial expression between the special symbols, e.g. #$part_locale {$locale}#, must contain syntactically correct partial expressions and field names for substitution into the SQL statements as required.

The above example embodiment of the invention allows a single report and model to handle many user languages.

In a further embodiment, the model element that describes the connection to the database is formed from a parameter map lookup based on a session variable that selects between test mode and production mode. This map defines the database connection for each mode. At run time, the mode is mapped to the database connection information, which is used to connect to the appropriate database.

For example the fragment of the macrotized SQL expression is:

```
    SELECT partno, partname_en from #$part_source#
``` where $part_source is a session parameter that should contain the name of a table, which is then substituted during preprocessing. In these embodiments it is required that all of the alternative databases contained in the sources table be compatible.

In this example the method described allows report authors to produce a single report and model to handle both the test and production models. Subsequently, no effort is required on the part of the report users who rely on their locale to insulate them from the underlying substitutions and conversions.

In the following embodiment of the invention the user is prompted to supply more information than can be ascertained from the data already available.

The first code snippet is the definition of an element requiring user input. gcol defined as:

```

$group_col{
prompt('gcolumn', 'token', '1')
}

```

At run time, this results in the following snippet of code. Here the user must provide at least some of the information required.

```
report on
gcol ----> user prompted
product.productname
details.quantity
      group_col -->default:
[qegosales].[PRODUCT].[PRODUCTNAME]
1 --> [qegosales] . [COUNTRY] . [COUNTRY]
2 -->[qegosales] . [PRODUCTLINE] . [PRODUCTLINE]
```

In further embodiments, the system provides default input if the user chooses not to provide any.

For convenience, the following sections describe some more interesting aspects of a Macro syntax used in one embodiment of the macro specification. In practice, many variations are possible. The macros are used to create runtime driven fragments of query code and provide a means to manipulate strings and string expressions.

Session Parameters (or Model Parameters)

```
$parameter_name    Evaluates to the value of the specified
                   session parameter or, if it is not defined, to an empty
                   string.
Examples:   $runLocale
            $account.defaultName
```

Parameter Map Entries

```
$map{<key expr>}   Evaluates to a value from a list of
                   entries of the specified map at the specified key, which
                   may be specified using a macro string expression.
Example:    $languages{ 'en-us' }
            $languages{ $runLocale }
```

These fragments rely on the existence of a table like the following:

|  | languages |  |
|---|---|---|
|  | Key | Value |
|  | en-us | English |
|  | fr | French |

In the second fragment, the parameter used is an assumed global variable, $runLocale, previously initialised appropriately.

Parameter Map

% map Evaluates to a reference to the specified map, not just a single entry.
Example: csvIdentityName(% mapRolesToKeys)

This provides all roles of the current user as a comma-separated list.

It makes reference to a table, like the following:

| mapRoles_to_Keys | |
|---|---|
| Key | Value |
| NA | NorthAmerica |
| EU | Europe |

-continued

| mapRoles_to_Keys | |
|---|---|
| Key | Value |
| . | . |
| . | . |
| . | . |

Complex Functions

CSVIdentityName returns a comma separated values list of the identity information remapped through the specified table.

```
syntax:   CSVIdentityName ( %map[,separator] )
example:  regionColumn in ( #CSVIdentityName (
          %region_for_identity," ,")# )
```

In use this might result in:

```
regionColumn in ('North America', 'Europe')
application:   to build partial in-clauses, to filter data
based on the identity name of the current user.
```

The Macros defined in embodiments of the invention provide partial expressions that can be used directly within database languages expressions, or within related Filters and Calculations.

Some functions take in a whole parameter map as an argument. This is expressed using the '%' character instead of the '$' character to precede the name of the map For example:

```
#in_clause_builder (
    "'",        // start quote for each element
    "'",        // end quote for each element
    ",",        // separator between elements
    %mymap)     // the map to get the entries from

```

As with many macro languages, additional control structures such as if-then-else, for-loop and do-while-loop, can be added, as well as array structures. Users (designers) are able to define and provide additional functions, which can also be extended to be more than a single statement.

Figure 4:
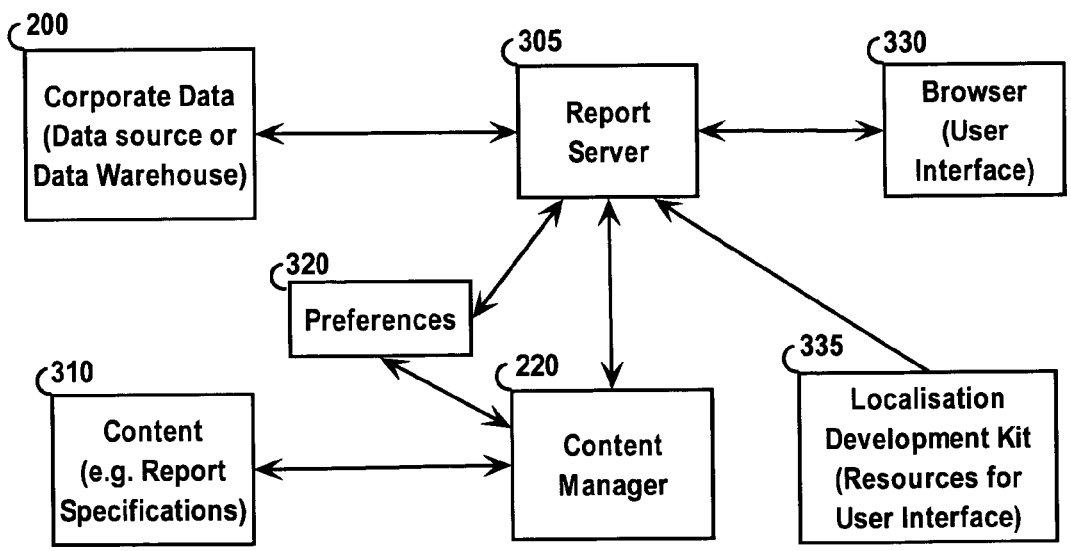
FIG. 4 illustrates one embodiment of the multilingual application support system.

As illustrated in FIG. 4, multilingual application support systems include a data source or data warehouse containing corporate data 200, which includes multi-lingual strings, and non-volatile, time-variant measures. This data 200 is accessed by a report server 305, under the control of a user (not shown) having a browser or client software (user interface) 330. Content data 310, which is used to describe the data source 300 (as metadata) and also contains information about any required reports is accessed from the content manager 220, which is activated by the report server 305, and are used by the report server 305, being derived from the content store 310 by the content manager 220. Preferences 320 are kept in the content store and are cached. A localization tool kit 335 provides application resources for the user interface 330.

It should be noted that a user might be an administrator, a report author, or a consumer, or any combination. It is only the user's competence that restricts their role. Hence the generic term user may replace the specific role titles.

Figure 5:
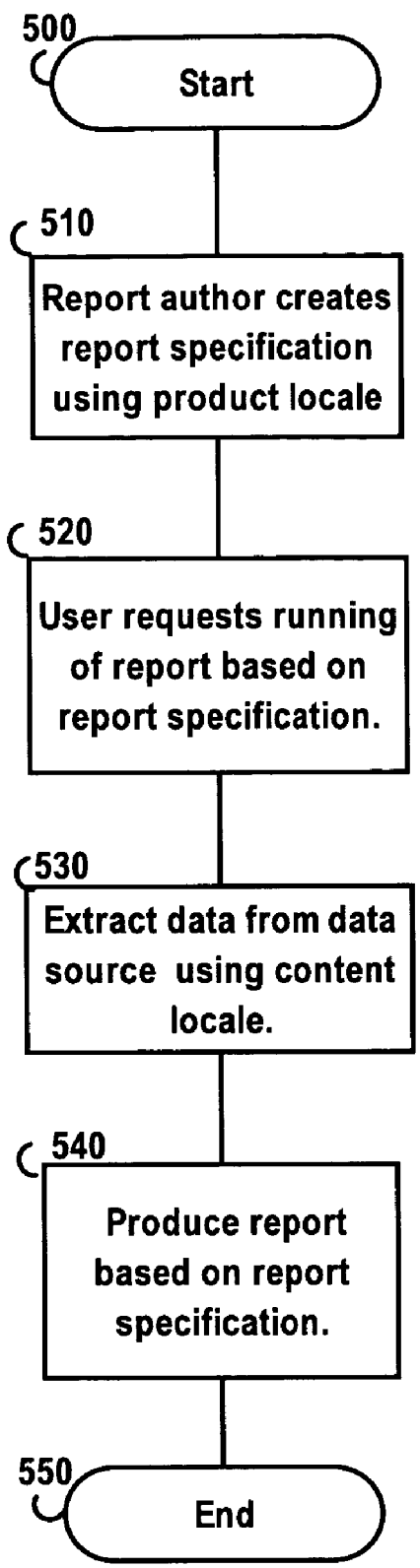
FIG. 5 is a simplified flowchart of the steps in using embodiments of the invention.

We now further describe the embodiments of the invention with reference to FIG. 5. The FIG. 5 shows in outline three steps in the production of a report. In the first step 510 application writers, known as report authors, create report specifications (or report formats) that can be used to extract and display business data as required across the corporation. The authoring of a report can be thought of as providing a skeleton or structure for the display of data. Although this structure (report format) does not contain the data, it does define where the data reside and also which parts of the data are to be used. The locale (i.e. the language and region) in which the report is to be used (or run) does not need to be taken (directly) into account since that aspect is handled (transparently) by the invention as previously described.

In the second step 520 a consumer simply requests that the report be run. Finally, the data, as defined by the report specification, is extracted 530 and a report produced 540 that meets both the corporate reporting requirements and the consumer's needs as specified by the content locale, and the sequence ends 550. In most situations, the steps 520, 530 and 540 may be repeated as required.

In some embodiments, a simplified user interface is provided at the second step to allow the consumer some degree of control over what particular data should be displayed (e.g. the products selected, or the time period covered).

Examples of each of these steps will now be described in more detail with reference to a practical example. Consider two collaborating report authors working in different languages, but charged with producing a corporate report format. Each author is able to logon and work independently.

The report authors each choose to work in one of a number of languages supported by the report authoring part of the multilingual business intelligence system. The language selection is made according to their individual preference, based on such things as skill level, or familiarity. This language is used as the product locale for that report author. During this development phase, the report authors may exchange the report specification as a work-in-progress. Using the same data source with its associated metadata model and a report server with its extended SQL capabilities, the collaborators will see the same report format, but rendered in their choice of language as selected at logon or as selected during the work session. In some cases, as a default, the browser or client environment locale is used. Note that, were the report authors to run the report specification with test cases against a test data source, they would see the resultant report according to their selected (or preferred) content locale.

When the report authors have finished their collaborative development a report specification is generated ready for deployment. Consumers using this report specification in any of the corporation's locations can, by selecting one of the supported content locales, view that report in their language of choice, again using the same data source (although in this case, it would be a production source, rather than some test/development source). Consumers need not be concerned with which locale is used during selection of data, and can produce reports in any of the supported locales with ease. The consumers carry out the same (or equivalent) operations as in previous products, but the resulting reports are made available or usable in any of the supported locales.

Embodiments of the invention provide for multilingual (multi-locale) columns. This is allows for report-specific data items that require calculations. These items are not part of the metadata model.

Application strings include information such as titles of reports that are not derived from the business data source directly. These strings must ultimately be provided by literal translation. In embodiments of the invention, they are supported so that when the report is run, the content locale ensures that the correct language is used, i.e. that of the consumer's preference. This remains true no matter where the report was authored (as defined by the product locale).

In various places in this description expressions like 'A is mapped to B' are used. These are to be treated as shorthand for 'Locale value A is replaced by locale value B based on an algorithm and any configuration data required by that algorithm'. Embodiments of the present invention use an algorithm that performs a lookup on a key/value table, using A as the key for the search. Other mechanisms are possible.

Configuration

In embodiments of the invention the various languages or locales and their defaults are configurable in the user interface, usually by an administrator.

Some examples of configuration options are listed below.

Product Locale:

Embodiments of the invention allow the removal of one or more of the installed product locales from the user interface. This permits simplification of the user interface in cases where users are known to require only a subset of the available user interface locales.

Content Locales:

Embodiments of the invention allow the removal of content locales in the user interface. This permits simplification of the user interface in cases where users are known to require only a subset of the available content locales. In other embodiments the addition of new content locales is supported so that users may customize the product, although in such cases, the language support is the customers responsibility.

Product Locale Mappings:

Embodiments of the invention allow mapping of full product locales to an available product locale, that is one for which some degree of support is provided. For example, if it was known that Vietnamese users generally preferred French as their default, Vietnamese can be mapped to French. An individual user can still select a specific product locale of Vietnamese in the user preferences if French is not desired.

Content Locale Mappings:

Embodiments of the invention allow various mappings of full content locales. Full content locales may be mapped to language-only locales (e.g. en) to permit access to content which is language sensitive but not locale sensitive. Note that, names and descriptions within the data source are generally specified by language (e.g. en English, fr French, etc.) not locale (e.g. en-ca English Canada, en-us English USA).

FIGS. 6 to 11 show screen shots from embodiments of the invention illustrating the locale mapping function.

FIG. 6 shows the user interface for mapping content locales. The user selected content locale can be mapped into another content locale. By default, all regions for a given language are mapped into that language through the use of the wild card (*). The administrator can modify this as they desire.

FIG. 7 shows how administrators can add or remove content locales. Unwanted content locals can be removed. The Add button can be used to add a locale back one it has been deleted.

FIG. 8 shows the user interface for determining what currencies are available for users to select when creating reports.

Figure 9:
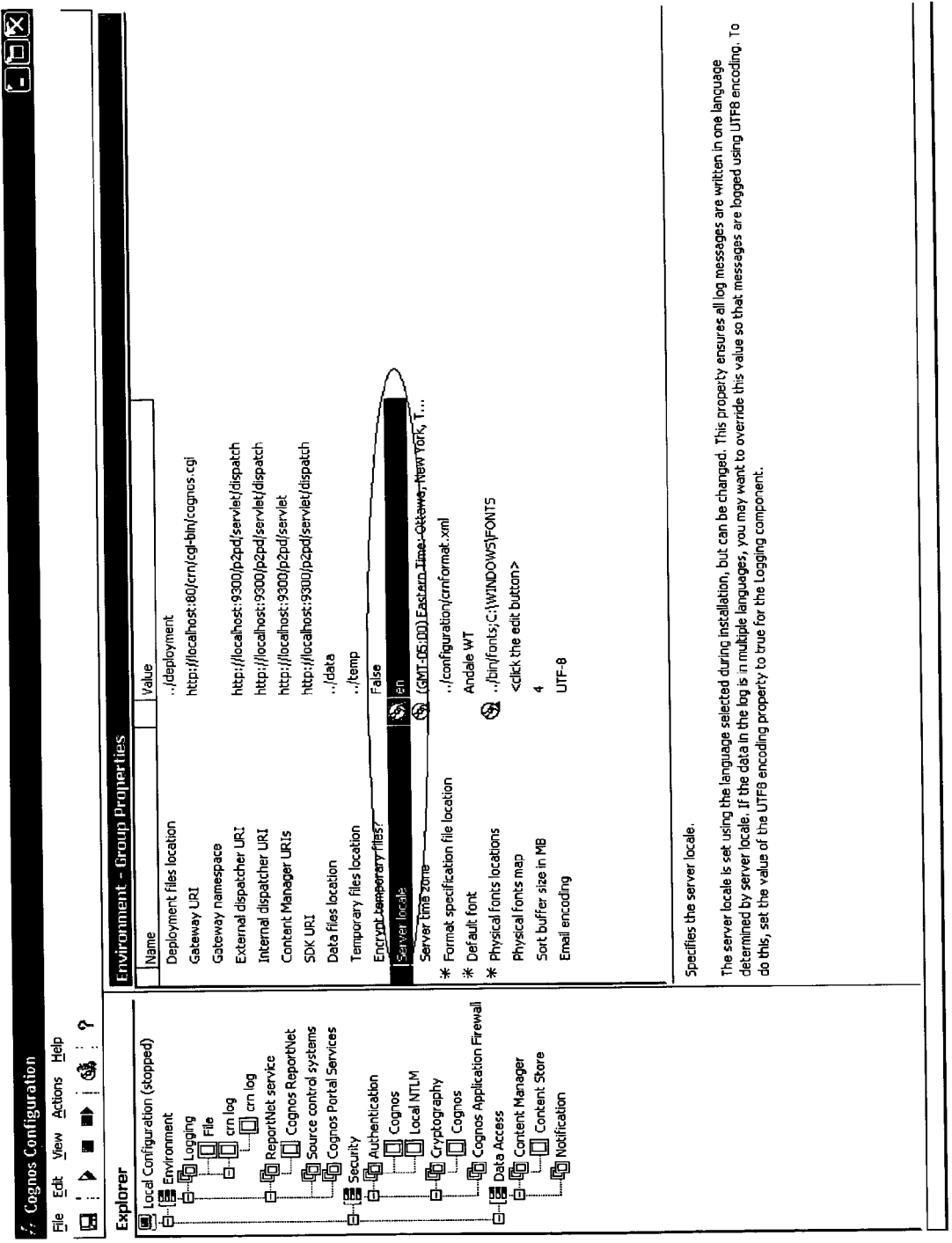

FIG. 9 shows the user interface for configuring the default locale. The selected language (Server locale) can be overridden.

Figure 10:
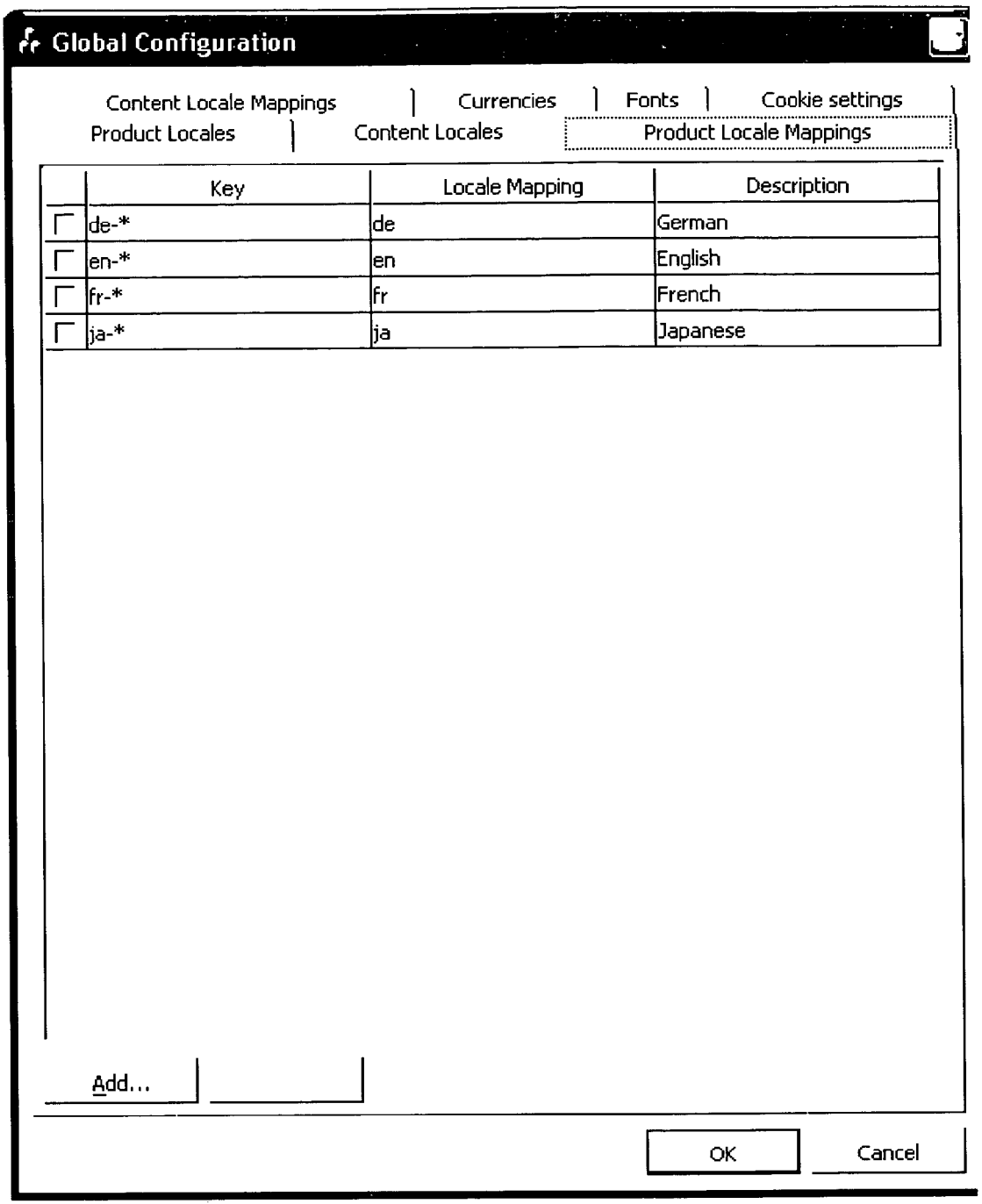

FIG. 10 shows how the administrator can change the mapping of product locales. The user-selected product locale can be mapped into another product locale. By default, all regions for a given language are mapped into that language through the user of the wild card (*). The administrator can modify this as they desire.

Figure 11:
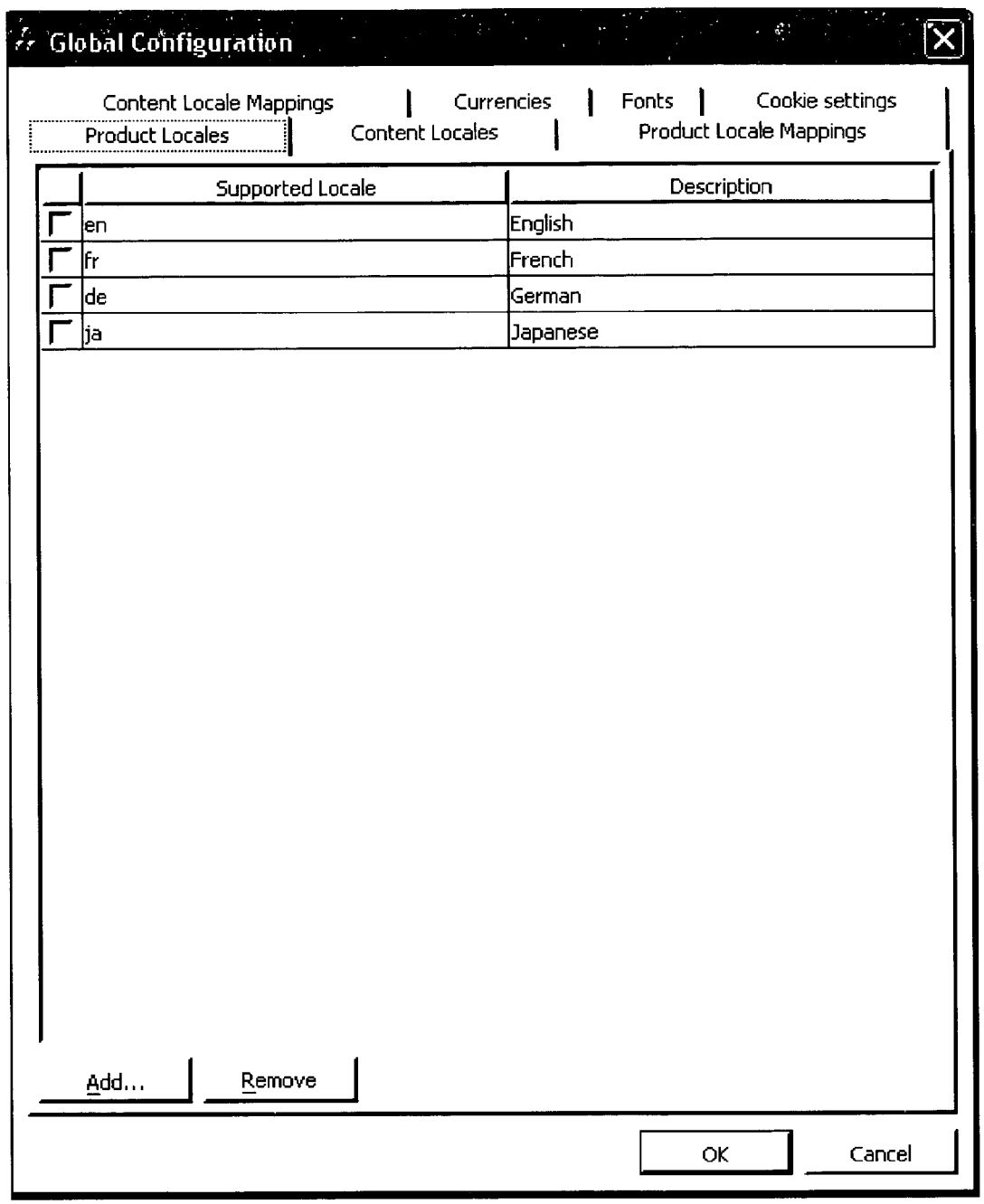

FIG. 11 shows how administrators can add or remove unwanted product (user interface) locales. The Add button can be used to add a locale back once it has been deleted.

Some embodiments of the invention include data formatters that render appropriate formats for dates, times, numbers, etc., inferred from the content locale. In some of these embodiments, language-only content locales (e.g. en) may be mapped to a default complete locale (ex. en-us) to improve access to content that is locale sensitive. For example, data format of dates and numbers requires a full locale as the data formatting is derived or inferred from the combination of language and region. This permits reports formatted in one locale to be easily ported to another where the formatting of certain data differs, but otherwise there is a high degree of commonality. The format depends on the content locale that is selected prior to running (or generating) a report.

In some embodiments, unsupported content locales are mapped to supported content locales.

The following example further illustrates embodiments of the invention. Consider an international company that stores its Product and Customer information in both French and English tables. The company stores its Order information only in an English table. Parameters are used to create conditional query subjects that allow for substitutions at report run time. Parameter maps that are similar to data source look-up tables are provided. Each parameter map has two columns, one for the key and one for the value that the key represents. Keys and values can be manually entered, imported from a file, or based on existing query items in the model. All parameter map keys must be unique so that the framework manager can consistently retrieve the correct value. In some embodiments the value of a parameter can be another parameter. By creating and using the following parameter maps, the administrators and report authors ensure that consumers can retrieve data that matches the information they require.

| Key | Value |
|---|---|
| LanguageSensitiveStatusTables | |
| P | #$ProductStatusTables {$contentLocale}# |
| O | #$OrderStatusTables {$contentLocale}# |
| ProductStatusTables | |
| en | EN_ProductStatus |
| fr | FR_ProductStatus |
| <default> | EN_ProductStatus |
| OrderStatusTables | |
| en | English_OrderStatus |
| fr | Order_Status_FR |
| <default> | English_OrderStatus |

The following intermediate code fragment (with macro-like elements) results in the retrieval of the code and description data that matches the defined parameter values:

```
SELECT code, description
FROM #$LanguageSensitiveStatusTables {'P'}#
```

If the value of the contentLocale parameter is fr, after substitutions this expression results in this code fragment:

```
SELECT code, description
FROM FR_ProductStatus
```

In embodiments of the invention, multilingual data is accessed by the query engine by modifying the SQL used to access the data source query subjects (tables). In preferred embodiments, the modifications are in the form of macro-like extensions to the syntax as described earlier. These extensions cause the resultant SQL queries to access the data appropriate to the content locale/language. Other equivalent mechanisms may be used.

Any hardware, software or a combination of hardware and software having the above-described functions may implement the multi-lingual capabilities according to the present invention and methods described above. The software code, either in its entirety or a part thereof, may be in the form of a computer program product such as a computer-readable memory having the system and/or method stored therein.

Furthermore, a computer data signal representation of that software code may be embedded in a carrier wave for transmission via communications network infrastructure. Such a computer program product and a computer data signal are also within the scope of the present invention, as well as the hardware, software and combination thereof.

Although the present invention has been described in considerable detail with reference to certain preferred embodiments thereof, other versions are possible. Therefore, the spirit and scope of the appended claims should not be limited to the description of the preferred embodiments contained herein.

Implementation Notes

Multilingual Databases

Any of several techniques may be used to manage multilingual information in databases. The normal case is that textual information associated with a code, for example a product description, is recorded in several different languages. Two such general techniques are 'coded row' and 'separate columns'.

In the 'coded row' technique illustrated in the following table each different language is assigned a separate row, in this case three such rows are shown and effectively a table row relating to a part number entry is replicated accordingly. A expression filtering on the query item Locale Language can then be used to extract the appropriate description.

In

| Part Number | Locale Language | Text |
|---|---|---|
| 2 | en | Toaster |
| 2 | fr | Grille-pain |
| 2 | <other language> | <other language text> | the 'separate columns' technique illustrated in the next table, each of the three languages is assigned a separate query item (or column), which is known. In this case, only one table row is required per part number entry.

| Part Number | English text | French text | <other language> text |
|---|---|---|---|
| 2 | Toaster | Grille-pain | <other language text> |

Other equivalent techniques are well known and may be used. The metadata model used with embodiments of the present invention must support the chosen technique so that a user running the same report sees the product description in their own language, with no work or intervention required by either the report author or the consumer. The use of distinct content locales also allows for a product description seen in England (e.g. en-gb (Great Britain) to differ from that seen in the USA (e.g. en-us) for a report resulting from the same report format.

Query Subjects and Query Items

Query subjects and query items are defined within the metadata model in terms of references to tables and columns in the data source (database). In some respects the terms may be considered synonymous with tables and columns, but in fact the metadata model and its associated framework manager hides from the user the translation of the underlying references into the objects used in populating reports with data.

Data Formats

Embodiments of the invention make use of well-known data formatting libraries (such as the International Components for Unicode (ICU) libraries) to provide a wide-ranging set of locale default formats for numbers, dates (short, long, complete and abbreviated), times, intervals, etc as well as allowing customized complete data formatting patterns.

Embodiments of the invention provide HTML Form controls that automatically adjust to accept numbers, dates, times, intervals and other measures in the user's locale format.

Configuration Implementation Details

The following procedures are available in some embodiments:

normalizeLocale( ):

Performs text manipulations on the locale string:

shifted to lowercase
'_' replaced with '-'.
validateContentLocale( )/validateProductLocale( ):

Returns true if the specified locale string is in the list of supported content locales/product locales, respectively. mapContentLocale( )/mapProductLocale( )

Maps the specified locale to a new locale, based on the map in the configuration.

If requested to do so, normalize specified locale.

Find the first map entry that "matches" the specified locale.

A map entry matches if:

the specified locale and the entry key locale matches --or--
the first subtag of the specified locale and the first subtag of the entry key locale matches and the second subtag of the entry key locale is '*'
(en-* matches en, en-gb, en-ca, en-us, ...)
(en-gb matches en-gb only)

Return the value locale from the found map entry, if one exists, else fault (error).

In summary, configuration parameters include the following Site Locale Tables:

A list of valid product locales (Product Locale Table),
A list of valid content locales (Content Locale Table),
A locale normalization mapping table (Locale Normalization Table),
A mapping table from any normalized locale to a supported product locale (Product Locale Mapping Table),
A mapping table from any normalized locale to a site preferred content locale (Content Locale Mapping Table).

The configuration tool manages these entries, giving the customer the ability to extend or modify these lists. The configuration tool can validate any target locale against ICU to ensure that they are valid locales.

The Configuration API provides the following functions:

Get—this returns the entire list of entries in a particular table.
Validate—this compares an input locale against a particular table, and returns true or false.
Normalize—this takes an input locale and returns the mapped entry from the Locale Normalization Table. It returns the input locale if the match fails.
Map—this takes an input locale and returns the mapped entry from the Product Locale Mapping Table or Content Locale Mapping Table. It is an error if the match fails.
MapNormalized—this function is supported for the Product Locale Mapping Table and the Content Locale Mapping Table. The function first ensures the input locale is normalized by mapping through the Locale Normalization Table, before attempting to map directly against the target table.

Process Initialization

The Configuration is initialized with these tables plus the server locale at the same time it retrieves other runtime parameters. Note that unlike runtime parameters these do not have to be refreshed, as they do not change for the life of the process. Each process level service will receive these along with runtime parameters and initialize Configuration API accordingly.

Session Initialization

Content Manager populates the product locale and content locale for a user session by:

Mapping through the Product Locale Mapping Table if necessary to compute a valid product locale, and
Ensuring that the resultant locales are normalized.
All components use the values in the user preference section of the BI Bus header.

Content

All "allowable" locale values are mapped using the Content Locale Mapping Table.

In case the locale configuration settings were updated after values were previously persisted in Content Manager, Content Manager normalizes the product locale and content locale values each time they are retrieved from the account object within the content store, and then maps the values using the Product Locale Mapping Table or the Content Locale Mapping Table as appropriate. Similarly, values retrieved from an external authentication (third party directory) provider are normalized and mapped each time they are retrieved.

User Preferences

The user interface logic:

Displays the appropriate list of choices for product locale and content locale

Ensures that the user input is valid, assisted by normalizing the input.

The Content Manager updates the session values for product locale, content locale, format, and time zone whenever it receives a request to update these settings.

User Interfaces

The user interface specification for ReportNet include tags to indicate which UI elements are driven by product locale, and which are driven by content locale.

Report Layout

The current report layout specification allows for:

Using locale as a condition selection on appropriate layout elements.

Messages

All messages returned to users are in the user's product locale.

Matching Rules for Locales

In all contexts, once a locale preference has been determined, the locale to be selected from the list of available locales in that context is determined as follows:

1. Normalize the requested locale.
2. Validate the normalized locale.
3. Look for an exact match between the normalized locale and the list of available "locales" of the requested object.
4. If no exact match is found, perform a content/product locale mapping on the normalized locale and look for an exact match between the mapped locale and the list of available "locales".
5. If still no exact match, perform content/product locale mappings on all available "locales" of the requested object and match the results with the mapped locale obtained in step 4. If multiple matches are available, pick the first one.
6. If still no matches are found, choose the default specified for the context.

Determining Locales

In some embodiments, various mechanisms are used for locale initialization:

Pre-authentication (such as an initial request, and subsequent prompting for credentials (as in logging on))

Authentication (ensuring that a user is permitted to perform this activity)

Post-authentication (similar to changing activity after logging on).

These mechanisms are described in more detail below.

Content locale and product locale are treated as two independent values—one is not derived from the other.

Pre-Authentication

The user's locale settings are determined using the following steps:

1. If either product locale or content locale or both are specified in the URL, those values there are used.
2. If product or content locale are not determined, the browser's language settings are consulted.
  a. If any setting (after normalization) is an allowable product locale, the first such setting is used as the user's product locale. If no allowable setting is found, browser settings are ignored for this purpose.
  b. If any setting (after normalization) is an allowable content locale, the first such setting is used as the user's content locale. If no valid setting is found, browser settings are ignored for this purpose.
3. In the unlikely event that a valid product or content locale still cannot be determined, then a server locale (as used by the Content Manager) is used.
4. The setting selected above is mapped through the appropriate (content or product) mapping table to determine the final value.

Authentication

The user's locale settings are determined using the following steps:

1. If values persisted in the user's account object in content store these values are used. These values override any values specified in the URL.
2. If product or content locale are not determined, then Content Manager looks in the account information resulting from authentication. If a locale setting is available there, it is used to determine product and content locale as follows:
  a. If the normalized value of the authentication provider's product locale is an allowable product locale, it is used. Otherwise the Product Locale Mapping Table is used to map to a valid product locale.
  b. If the normalized value of the authentication provider's content locale is an allowable content locale, it is used. Otherwise the Content Locale Mapping Table is used to map to a valid content locale.
3. If product or content locale are still not determined and if either product locale or content locale or both are specified on the URL those values are used.
4. If product or content locale are still not determined, the browser's language settings is consulted.
  a. If any setting (after normalization) is an allowable product locale, the first such setting is used as the user's product locale. If no allowable setting is found, browser settings are ignored for this purpose.
  b. If any setting (after normalization) is an allowable content locale, the first such setting is used as the user's content locale. If no valid setting is found, browser settings are ignored for this purpose.
5. In the unlikely event that a valid product or content locale still cannot be determined, then a server locale (as used by the Content Manager) is used.
6. The setting selected above is mapped through the appropriate (content or product) mapping table to determine the final value.

Post-authentication:

The user's locale settings are determined using the following steps:

1. If either product locale or content locale or both are specified in the URL, those values there are used.
2. If product or content locale are not determined and if there are values persisted in the user's account object in content store these values are used.

3. If product or content locale are still not determined, then Content Manager looks in the account information resulting from authentication. If a locale setting is available there, it is used to determine product and content locale as follows:
   a. If the normalized value of the authentication provider's product locale is an allowable product locale, it is used. Otherwise the Product Locale Mapping Table is used to map to a valid product locale.
   b. If the normalized value of the authentication provider's content locale is an allowable content locale, it is used. Otherwise the Content Locale Mapping Table is used to map to a valid content locale.
4. If product or content locale are still not determined, the browser's language settings is consulted.
   a. If any setting (after normalization) is an allowable product locale, the first such setting is used as the user's product locale. If no allowable setting is found, browser settings are ignored for this purpose.
   b. If any setting (after normalization) is an allowable content locale, the first such setting is used as the user's content locale. If no valid setting is found, browser settings are ignored for this purpose.
5. In the unlikely event that a valid product or content locale still cannot be determined, then a server locale (as used by the Content Manager) is used.
6. The setting selected above is mapped through the appropriate (content or product) mapping table to determine the final value.

Once the normalized (not the mapped) values of the user's product and content locales are determined, they are used throughout the session.

What is claimed is:

1. A method for preparing multilingual reports at client sites, the client sites connected to a server and a data source of a database, the method comprising:
   receiving selection of a product locale from a plurality of locales at a client site, wherein the product locale defines a user interface appearance for a user interface, and wherein each of the client sites uses at least one of the plurality of locales;
   generating a report specification based on input received from the user interface, wherein the report specification is used to extract data from the data source of the database, and wherein the report specification provides a structure for a report produced from the report specification;
   receiving selection of a content locale from the plurality of locales at the client site;
   constructing a metadata model having run-time parameters, wherein the run-time parameters include a session parameter that is based on the content locale, and wherein the metadata model includes model objects representing the data source of the database;
   building a query using the report specification and the metadata model, wherein the query includes at least one data access statement having one or more expressions that determine one or more tables to use for substitution into the one or more expressions, wherein each of the one or more tables maps session parameters to values, and wherein at least one of the one or more tables comprises a parameter map defining an entire expression;
   substituting one or more values into the one or more expressions based on the session parameter and the one or more tables to generate a resultant query, wherein the session parameter determines an appropriate entry in each of the one or more tables;
   extracting content locale-specific data from the data source of the database using the resultant query; and
   preparing a report using the extracted content locale-specific data, wherein the content locale defines an appearance and a format for content within the report.

2. The method of claim 1, wherein the one or more expressions comprise one or more macro-style text substitution expressions.

3. The method of claim 1, wherein the run-time parameters are updated by a lookup on a key-value table.

4. The method of claim 1, wherein the run-time parameters are updated by a lookup on a coded row table.

5. The method of claim 1, wherein the run-time parameters are updated by a lookup on a key-value table with separate query items on separate columns.

6. The method of claim 1, wherein the query is in Structured Query Language (SQL), and the one or more expressions are macrotized SQL expressions.

7. The method of claim 1, further comprising validating arbitrary content locale values, and mapping the arbitrary content locale values to content locale values in the data source.

8. The method of claim 1, wherein the product locale is a system default locale.

9. The method of claim 1, wherein the content locale is a browser locale.

10. The method of claim 1, wherein the content locale is a client environment locale.

11. The method of claim 1, further comprising mapping full product locales to an available product locale.

12. The method of claim 1 further comprising formatting dates, times, numbers and other numeric data inferred from the content locale.

13. A computer-readable memory medium storing instructions that cause a computer to:
   receive selection of a product locale from a plurality of locales at a client site, wherein the product locale defines a user interface appearance for a user interface, and wherein the client site is part of a plurality of client sites, and wherein each of the client sites uses at least one of the plurality of locales;
   generate a report specification based on input received from the user interface, wherein the report specification is used to extract data from the data source of the database, and wherein the report specification provides a structure for a report produced from the report specification;
   receive selection of a content locale from the plurality of locales at the client site;
   construct a metadata model having run-time parameters, wherein the run-time parameters include a session parameter that is based on the content locale, and wherein the metadata model includes model objects representing the data source of the database;
   build a query using the report specification and the metadata model, wherein the query includes at least one data access statement having one or more expressions that determine one or more tables to use for substitution into the one or more expressions, wherein each of the one or more tables maps session parameters to values, and wherein at least one of the one or more tables comprises a parameter map defining an entire expression;
   substitute one or more values into the one or more expressions based on the session parameter and the one or more tables to generate a resultant query, wherein the session parameter determines an appropriate entry in each of the one or more tables;

extract content locale-specific data from the data source of the database using the resultant query; and prepare a report using the extracted content locale-specific data, wherein the content locale defines an appearance and a format for content within the report.

14. The computer-readable memory of claim 13, wherein the query is in Structured Query Language (SQL), and the one or more expressions are macrotized SQL expressions.

15. The computer-readable memory of claim 13, further comprising instructions to validate arbitrary content locale values, and mapping the arbitrary content locale values to content locale values in the data source.

16. The computer-readable memory medium of claim 13, wherein the product locale is a system default locale.

17. The computer-readable memory of claim 13, wherein the content locale is a browser locale.

18. The computer-readable memory of claim 13, wherein the content locale is a client environment locale.

19. The computer-readable memory of claim 13, further comprising instructions to format dates, times, numbers and other numeric data inferred from the content locale.

* * * * *